(12) United States Patent
Li

(10) Patent No.: US 9,332,085 B2
(45) Date of Patent: May 3, 2016

(54) METHOD AND SYSTEM FOR REALIZING REST INTERFACE OF CLOUD CACHE IN NGINX

(75) Inventor: Zhongliang Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 112 days.

(21) Appl. No.: 14/241,689

(22) PCT Filed: Apr. 23, 2012

(86) PCT No.: PCT/CN2012/074561
§ 371 (c)(1),
(2), (4) Date: Feb. 27, 2014

(87) PCT Pub. No.: WO2013/044628
PCT Pub. Date: Apr. 4, 2013

(65) Prior Publication Data
US 2014/0195635 A1    Jul. 10, 2014

(30) Foreign Application Priority Data
Sep. 26, 2011   (CN) .......................... 2011 1 0288598

(51) Int. Cl.
G06F 15/167 (2006.01)
H04L 29/08 (2006.01)
H04L 29/06 (2006.01)
(52) U.S. Cl.
CPC ............ *H04L 67/2842* (2013.01); *H04L 67/02* (2013.01); *H04L 67/2823* (2013.01); *H04L 69/08* (2013.01)
(58) Field of Classification Search
USPC ......................................... 709/213, 223, 224
See application file for complete search history.

(56) References Cited

U.S. PATENT DOCUMENTS

| 7,596,620 B1 * | 9/2009 | Colton ..................... G06F 8/10 709/223 |
| 2003/0115346 A1 | 6/2003 | Caldecott et al. |

(Continued)

FOREIGN PATENT DOCUMENTS

| CN | 101751408 A | 6/2010 |
| CN | 102055771 A | 5/2011 |

OTHER PUBLICATIONS

Extended European Search Report for PCT/CN2010/071958 mailed Apr. 22, 2015 in 4 pages. (EP Application No. 12836160.7).

(Continued)

*Primary Examiner* — Philip B Tran
(74) *Attorney, Agent, or Firm* — Knobbe, Martens, Olson & Bear, LLP

(57) ABSTRACT

The present invention provides a method for realizing a REST (Representational State Transfer) interface of a cloud cache in an Nginx. The method includes: receiving a Hyper Text Transport Protocol (HTTP) message transmitted from a client, and parsing out key information and an operation type corresponding to the HTTP message according to a preset configuration file; converting the key information and the operation type into a parameter required by a cloud cache operation and a cloud cache operation type, and transmitting the parameter to a cloud cache apparatus, so that the cloud cache apparatus performs the cloud cache operation according to the parameter and the cloud cache operation type; receiving a cloud cache operation result returned by the cloud cache apparatus, processing the cloud cache operation result, and returning the processed result to the client. The present invention also provides a corresponding system. The present invention enables a larger cache capacity and better saves CPU resources, thereby enabling a more powerful cache function of the Nginx.

10 Claims, 8 Drawing Sheets

(56) References Cited

U.S. PATENT DOCUMENTS

| | | |
|---|---|---|
| 2006/0010442 A1 | 1/2006 | Desai et al. |
| 2010/0333116 A1* | 12/2010 | Prahlad .............. G06F 17/3002 709/216 |
| 2011/0314121 A1* | 12/2011 | Navda .................... H04W 4/18 709/217 |
| 2012/0203823 A1* | 8/2012 | Manglik ............... G06F 9/5072 709/203 |

OTHER PUBLICATIONS

Anonymous: "Cloud storage gateway—Wikipedia, the free encyclopedia", Aug. 2, 2011, XP055179601, retrieved from the Internet: URL:http://en.wikipedia.org/w/index.php?title=Cloud_storage_gateway&oldid=442653385 in 2 pages.

* cited by examiner

METHOD AND SYSTEM FOR REALIZING REST INTERFACE OF CLOUD CACHE IN NGINX

CROSS-REFERENCE TO RELATED APPLICATIONS

This application is the U.S. National Phase under 35. U.S.C. §371 of International Application PCT/CN2012/074561, filed Apr. 23, 2012, which claims priority to Chinese Patent Application No. 201110288598.5, filed Sep. 26, 2011. The disclosures of the above-described applications are hereby incorporated by reference in their entirety. The International Application was published under PCT Article 21(2) in a language other than English.

TECHNICAL FIELD

The present invention relates to the technical field of communications, and in particular to a method and system for realizing a REST (Representational State Transfer) interface of a cloud cache in an Engine x (Nginx).

BACKGROUND

Nginx is a high-performance Hyper Text Transport Protocol (HTTP) reverse Proxy Server, and meanwhile an IMAP/POP3/SMTP proxy server. It has advantages of simple installation, concise configuration file, easy startup, high stability and low consumption of system resources, and moreover, the Nginx does not require a restart even after several months of running.

At present, the Nginx has been widely used and existing Nginx generally adopts a high-speed cache (also short as cache) to realize the cache function of the Nginx. However, the existing Nginx adopting the high-speed cache usually has drawbacks of low performance, low reliability and poor extensibility.

SUMMARY

The present invention provides a method for realizing a REST interface of a cloud cache in an Nginx, which combines the Nginx and cloud cache, enables a larger cache capacity and better saves CPU resources, thereby enabling a more powerful cache function of the Nginx.

The embodiment of the present invention provides a method for realizing a REST interface of a cloud cache in an Nginx, which includes:

receiving a Hyper Text Transport Protocol (HTTP) message transmitted from a client, and parsing out key information and an operation type corresponding to the HTTP message according to a preset configuration file;

converting the key information and the operation type into a parameter required by a cloud cache operation and a cloud cache operation type, and transmitting the parameter to a cloud cache apparatus, so that the cloud cache apparatus performs the cloud cache operation according to the parameter and the cloud cache operation type;

receiving a cloud cache operation result returned by the cloud cache apparatus, processing the cloud cache operation result, and returning the processed result to the client.

Preferably, converting the key information and the operation type into the parameter required by the cloud cache operation and the cloud cache operation type, and transmitting the parameter to the cloud cache apparatus includes:

packaging the key information corresponding to the HTTP message as a Key-Value packet required by the cloud cache operation, and transmitting the Key-Value packet to the cloud cache apparatus for processing; and converting the operation type into the cloud cache operation type, so that the cloud cache apparatus operates according to the cloud cache operation type.

Preferably, after converting the operation type into the cloud cache operation type, the method further includes:

establishing one named pipe according to the cloud cache operation type;

regularly detecting whether there are data returned from the cloud cache apparatus existing in the named pipe; if there are data returned from the cloud cache apparatus existing in the named pipe, reading out the data in the pipe file.

Preferably, returning the cloud cache operation result by the cloud cache apparatus includes:

detecting whether the named pipe exists;

if the named pipe exists, writing data into the named pipe.

Preferably, before converting the key information and the operation type into the parameter required by the cloud cache operation and the cloud cache operation type, the method further includes:

judging whether the key information is correct or whether the operation type is enabled;

if the key information is not correct or the operation type is not enabled, ending the process.

The embodiment of the present invention also provides a system for realizing a Representational State Transfer (REST) interface of a cloud cache in an Engine x (Nginx), the system including: a cache plugin and a cloud cache apparatus, wherein the cloud cache apparatus is configured to perform a cloud cache operation, and the cache plugin includes:

a parsing module, which is configured to receive a Hyper Text Transport Protocol (HTTP) message transmitted from a client, and parse out key information and an operation type corresponding to the HTTP message according to a preset configuration file;

a conversion module, which is configured to convert the key information and the operation type into a parameter required by a cloud cache operation and a cloud cache operation type, and transmit the parameter to the cloud cache apparatus, so that the cloud cache apparatus performs the cloud cache operation according to the parameter and the cloud cache operation type; and a return module, which is configured to receive a cloud cache operation result returned by the cloud cache apparatus, process the cloud cache operation result, and return the processed result to the client.

Preferably, the conversion module includes:

a packaging unit, which is configured to package the key information corresponding to the HTTP message as a Key-Value packet required by the cloud cache operation, and transmit the Key-Value packet to the cloud cache apparatus for processing; and a conversion unit, which is configured to convert the operation type into the cloud cache operation type, so that the cloud cache apparatus operates according to the cloud cache operation type.

Preferably, the cache plugin further includes:

an establishment module, which is configured to establish one named pipe according to the cloud cache operation type;

a reading module, which is configured to regularly detect whether there are data returned from the cloud cache apparatus existing in the named pipe, and read out the data in the pipe file if there are data returned from the cloud cache apparatus existing in the named pipe.

Preferably, the cloud cache apparatus includes:

a detection module, which is configured to detect whether the named pipe exists;

a writing module, which is configured to write data into the named pipe if the named pipe exists.

Preferably, the cache plugin further includes:

a judgment module, which is configured to judge whether the key information is correct or whether the operation type is enabled, and end the process if the key information is not correct or the operation type is not enabled.

In the embodiment of the present invention, an Nginx cache is replaced with a cloud cache apparatus, the Nginx and the cloud cache apparatus are combined by implementing a cache plugin in a Nginx server, so as to establish data transfer between the Nginx and the cloud cache apparatus, thereby realizing the cache function of the Nginx using the cloud cache apparatus and realizing a REST interface of a cloud cache. The method realizes the cache function of the Nginx using a cloud cache technology rather than a cache of the Nginx, which can better save CPU resources, and enable a larger cache capacity and a more powerful cache function of the Nginx, owing to the high performance of the Nginx and the high performance, high reliability and good extensibility of cloud cache.

DETAILED DESCRIPTION OF THE EMBODIMENTS

It should be understood that specific embodiments described hereinafter are used to illustrate the present invention but to limit the present invention.

Figure 1:
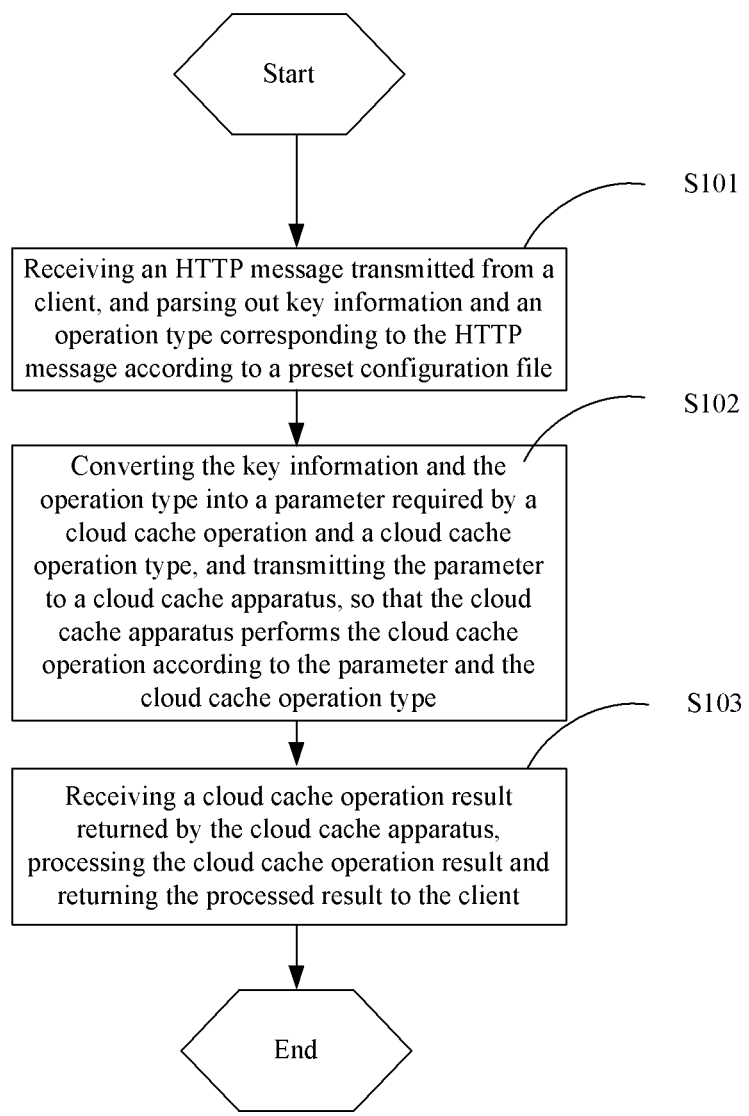
FIG. 1 shows a flowchart of one embodiment of a method for realizing a REST interface of a cloud cache in an Nginx according to the present invention.

Referring to FIG. 1, which shows one embodiment of a method for realizing a REST interface of a cloud cache in an Nginx according to the present invention, the method includes the following steps.

Step S101: an HTTP message transmitted from a client is received, and key information and an operation type corresponding to the HTTP message are parsed out according to a preset configuration file.

In this embodiment, an existing cache for the Nginx is replaced by a cloud cache apparatus, that is to say, the cache mechanism of the Nginx is separated and is submitted to a cloud cache thread for maintenance and management. Meanwhile, one cache plugin is set in the Nginx server to combine the Nginx and the cloud cache apparatus, so as to establish data transfer between the Nginx and the cloud cache apparatus.

After the Nginx is started, the Nginx would acquire automatically a configuration file preset in the system. This configuration file includes the configuration information added in Nginx.conf according to the configuration content required by the system. Meanwhile, the cloud cache apparatus starts to load a dynamic file library thereof so as to start a cloud cache thread. Then, a snooping port of the Nginx waits a request of a HTTP message; after receiving an HTTP message, this message is submitted to the cache plugin for processing. The cache plugin parses out the key information corresponding to the HTTP message and the operation type of the HTTP message according to the configuration information included in the configuration file. The configuration of the Nginx system is very flexible, which not only supports the configuration of expected quantity value but also supports the configuration of variable, so that parameters can be changed with each HTTP request. In this embodiment, variables can be configured in the configuration file; when the HTTP-Header of the HTTP message received by the Nginx system has a variable, the cache plugin would determine the cloud cache operation type corresponding to the HTTP message according to this variable preferably.

Step S102: the key information and the operation type are converted into a parameter required by a cloud cache operation and a cloud cache operation type, and the parameter is transmitted to a cloud cache apparatus, so that the cloud cache apparatus can perform the cloud cache operation according to the parameter and the cloud cache operation type.

In this embodiment, since the buffering function of the Nginx is realized by the cloud cache apparatus which is a distributed cache system based on Key-Value storage mode, after the key information corresponding to the HTTP message is parsed out according to the configuration information in the configuration file, it is needed to convert the key information into a parameter required by the cloud cache operation; meanwhile, since the operation type of the HTTP message is REST interface, including: POST, GET, DELETE and PUT, and the cloud cache operation supports six operation types, including: SET operation, GET operation, DELETE operation, GETDEL operation, INCR operation and STEP operation, it is needed to convert the operation type of the received HTTP message into the cloud cache operation type supported by the cloud cache operation. Then, the converted parameter required by the cloud cache operation is transmitted to the cloud cache apparatus, so that the cloud cache apparatus can perform the cloud cache operation according to the received parameter and the cloud cache operation type.

Step S103: a cloud cache operation result returned by the cloud cache apparatus is received; the cloud cache operation result is processed and then returned to the client.

After the cloud cache apparatus performs the cloud cache operation according to the received parameter and the cloud cache operation type, the cloud cache apparatus would return the operation result to the cache plugin. After receiving the operation result returned by the cloud cache apparatus, the cache plugin further processes the operation result and return the processed result to the client. In this embodiment, processing the operation result refers to recombining the operation result into the content needed by the HTTP request message requested by the client and returning the content to the HTTP client through an existing channel of the Nginx. In this way, the cache function of the Nginx can be realized through cloud cache in the Nginx and the purpose of realizing a REST interface of a cloud cache is achieved.

The method provided by the embodiment of the present invention for realizing a REST interface of a cloud cache in an Nginx combines the Nginx and the cloud cache apparatus by replacing an Nginx cache with the cloud cache apparatus and implementing a cache plugin in the Nginx server, so as to establish data transfer between the Nginx and the cloud cache apparatus, thereby realizing the cache function of the Nginx using the cloud cache apparatus in the Nginx and realizing a REST interface of a cloud cache. The method adopted to realize the cache function of the Nginx using a cloud cache technology rather than a cache of the Nginx can better save CPU resources, and enable a larger cache capacity and a more powerful cache function of the Nginx, owing to the high performance of the Nginx and the high performance, high reliability and good extensibility of cloud cache.

Figure 2:
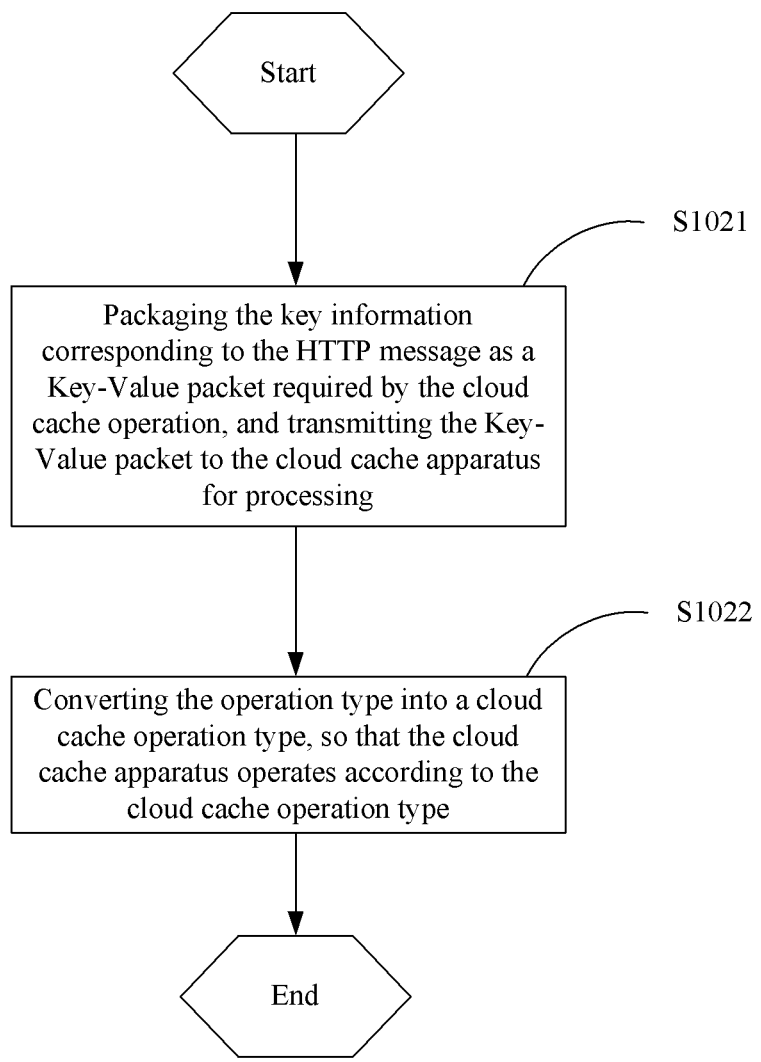
FIG. 2 shows a flowchart of conversion in one embodiment of the method for realizing a REST interface of a cloud cache in an Nginx according to the present invention.

Referring to FIG. 2, in one embodiment of the method for realizing a REST interface of a cloud cache in an Nginx according to the present invention, Step S102 includes the following steps.

Step S1021: the key information corresponding to the HTTP message is packaged as a Key-Value packet required by the cloud cache operation, and the Key-Value packet is transmitted to the cloud cache apparatus for processing.

In this embodiment, since the cloud cache apparatus is a distributed cache system based on Key-Value storage mode, after the key information corresponding to the HTTP message is parsed out, the key information is converted into a parameter required by the cloud cache operation; thus, it is needed to package the key information of the HTTP message as the Key-Value storage mode based data used for a cloud cache, that is, package the key information to form a Key-Value packet of the cloud cache, and then the Key-Value packet is transmitted to the cloud cache apparatus, so that the cloud cache apparatus performs the cloud cache operation according to the data contained in the Key-Value packet after receiving the Key-Value packet.

Step S1022: the operation type is converted into a cloud cache operation type, so that the cloud cache apparatus can operate according to the cloud cache operation type.

After the operation type corresponding to the received HTTP message is obtained according to the configuration information included in the preset configuration file, since the cloud cache apparatus does not support the REST interface, it is needed to convert the operation type of the HTTP into a cloud cache operation type supported by the cloud cache operation, so that the operation can be performed in the cloud cache apparatus according to the cloud cache operation type. In this embodiment, in the operation type conversion, POST operation and PUT operate can be converted into a cloud cache SET operation, GET operation can be converted into a cloud cache GET operation, DELETE operation can be converted into a cloud cache DELETE operation; then, the cloud cache apparatus can perform corresponding cloud cache operation according to the cloud cache operation type. In this way, REST interface can be realized on cloud cache. If a variable is configured in the configuration file of the Nginx:

dcache_incr_base $http_base;
dcache_incr_step $http_step;

and the HTTP-Header of the HTTP message received by the Nginx has the following message header:

base:1000
step:1 then, while parsing the operation type of the HTTP message, it can be determined that the operation type of the HTTP message is INCR operation according to this variable.

The key information corresponding to the HTTP message is packaged as a Key-Value packet of the cloud cache, so that the cloud cache apparatus performs the cloud cache operation according to the data in the Key-Value packet. Meanwhile, the operation type of the HTTP message is converted into a cloud cache operation type supported by the cloud cache operation, so that the cloud cache apparatus performs the corresponding cloud cache operation according to the cloud cache operation type. In this way, the REST interface of the cloud cache apparatus is realized; thus, the cache function of the Nginx can be realized through cloud cache, the large cache capacity is further guaranteed, and the cache function of the Nginx is more powerful.

Figure 3:
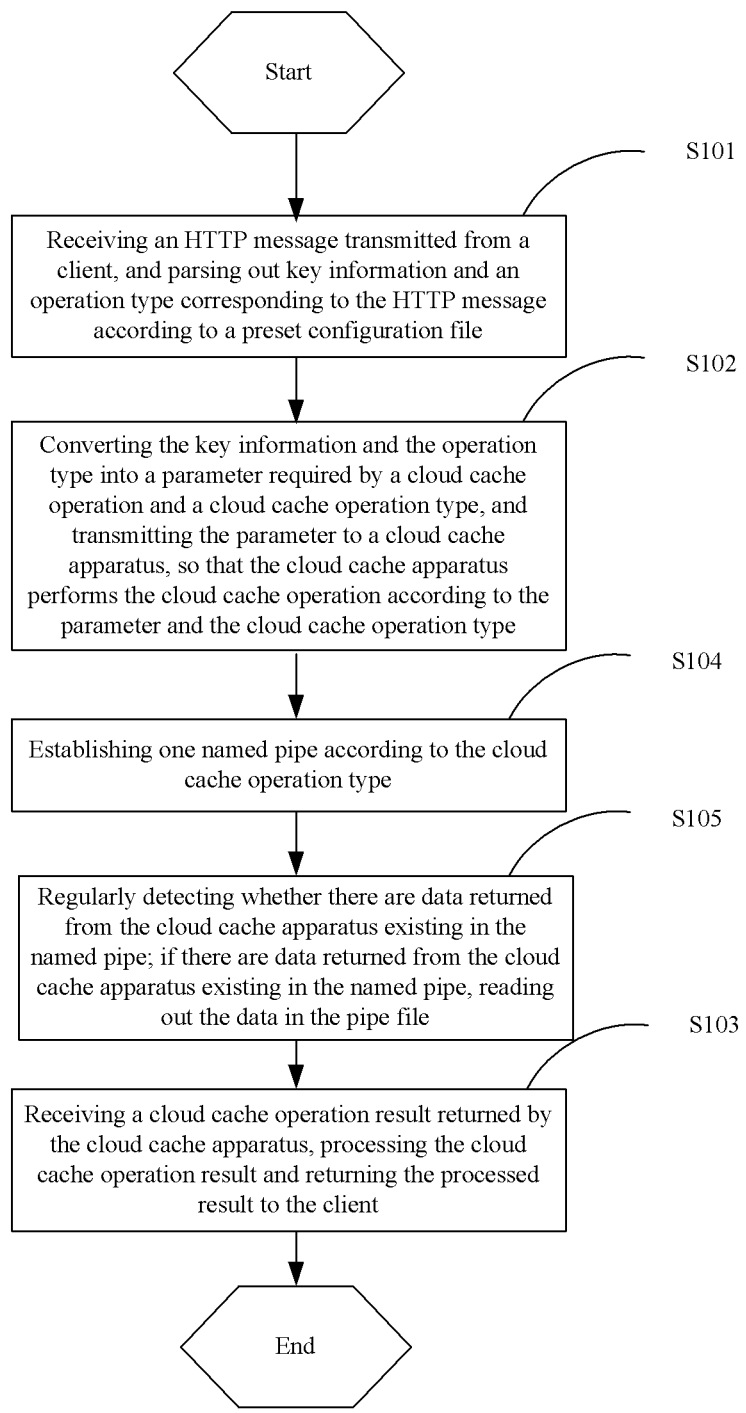
FIG. 3 shows a flowchart of named pipe establishment in one embodiment of the method for realizing a REST interface of a cloud cache in an Nginx according to the present invention.

Referring to FIG. 3, in one embodiment of the method for realizing a REST interface of a cloud cache in an Nginx according to the present invention, after Step S102 and before Step S103, the method further includes the following steps.

Step S104: one named pipe is established according to the cloud cache operation type.

Since the Nginx has no available support function to support the communication mechanism between non-related programs at present, a named pipe mode is adopted to establish the data communication between the cloud cache thread and the Nginx in this embodiment. In this way, after the operation type of the HTTP message is converted into a cloud cache operation type, one named pipe can be established according to the cloud cache operation type, wherein this named pipe is used to implement the data communication between the cache plugin and the cloud cache apparatus. The Nginx runs multiple threads, thus, one named pipe is established; since this named pipe is unique, the uniqueness of the data communication between the cache plugin and the cloud cache apparatus can be ensured. In this way, the cloud cache apparatus calls an interface function of itself to perform the corresponding cloud cache operation according to the cloud cache operation type converted from the operation type of the HTTP message, and writes data subjected to the cloud cache operation into the named pipe and returns.

Step S105: it is regularly detected whether there are data returned from the cloud cache apparatus existing in the named pipe; if there are data returned from the cloud cache apparatus existing in the named pipe, the data in the pipe file are read out.

While the cloud cache apparatus performs the corresponding cloud cache operation according to the cloud cache operation type converted from the operation type of the HTTP message, a timer used for periodically detecting the named pipe is started, so as to regularly detect whether there are data subjected to the cloud cache operation according to the cloud cache operation type returned from the cloud cache apparatus existing in the named pipe; if it is detected that there are data existing in the named pipe, this data can be read out. In this way, the data communication between the cloud cache thread and the Nginx is completed.

One named pipe is established according to the cloud cache operation type corresponding to the HTTP message, to ensure the uniqueness of the data communication between the cache plugin and the cloud cache apparatus. In this way, after the cloud cache apparatus performs the cloud cache operation, and after it is determined through the timer that there are data returned from the cloud cache apparatus existing in the named pipe, it is only needed to read out the data in the named pipe. This named pipe mode, which is adopted to realize the data communication between the cloud cache apparatus and the Nginx, not only ensures the accuracy and uniqueness of the data, but also accomplishes the cloud cache operation conveniently and quickly, thereby further guaranteeing the powerful performance of the Nginx cache and saving the wait time of a user.

Figure 4:
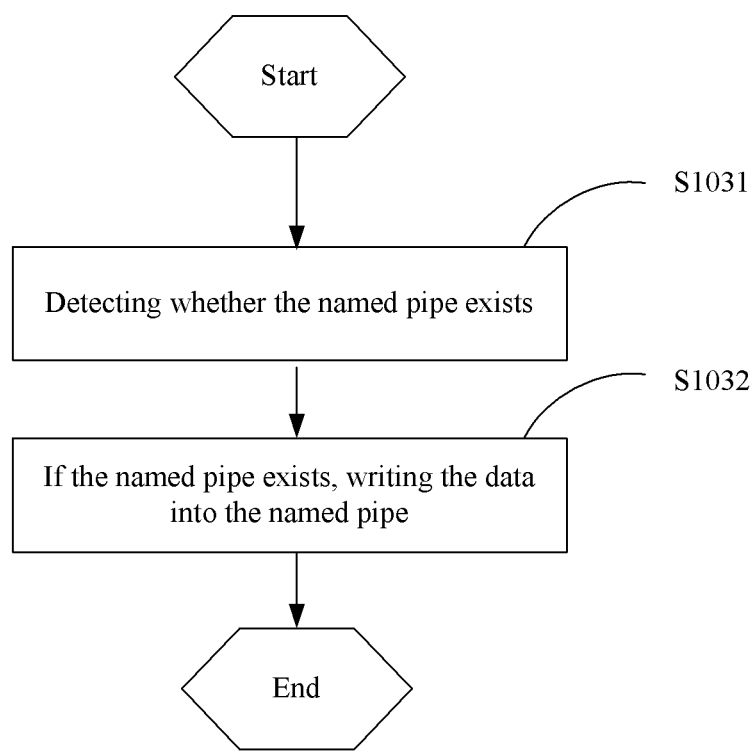
FIG. 4 shows a flowchart of return in one embodiment of the method for realizing a REST interface of a cloud cache in an Nginx according to the present invention.

Referring to FIG. 4, in one embodiment of the method for realizing a REST interface of a cloud cache in an Nginx according to the present invention, Step S103 includes the following steps.

Step S1031: it is detected whether the named pipe exists.

After the cloud cache apparatus calls an interface function of itself and performs the corresponding cloud cache operation according to the cloud cache operation type corresponding to the received HTTP message, the cloud cache apparatus would write the data obtained after the operation into the named pipe established by the cache plugin for storage, and return this named pipe. Therefore, after the cloud cache operation is completed, the cloud cache apparatus would first detect whether the named pipe established by the cache plugin exists, so as to write the data into the pipe and return the pipe.

Step S1032: if the named pipe exists, the data are written into the named pipe.

If the cloud cache apparatus detects that the named pipe established by the cache plugin exists, the cloud cache apparatus would write the data subjected to the cloud cache operation according to the received cloud cache operation type into this pipe, and then return the named pipe stored with data to the cache plugin.

After the cloud cache apparatus performs the corresponding operation according to the received cloud cache operation type and needs to store and return the data obtained after the operation, the cloud cache apparatus first detects whether the named pipe established by the cache plugin exists; after detecting the named pipe, the cloud cache apparatus can write the data into the pipe and then return the pipe file to the cache plugin, so that the cache plugin can read out the data in the pipe file.

Figure 5:
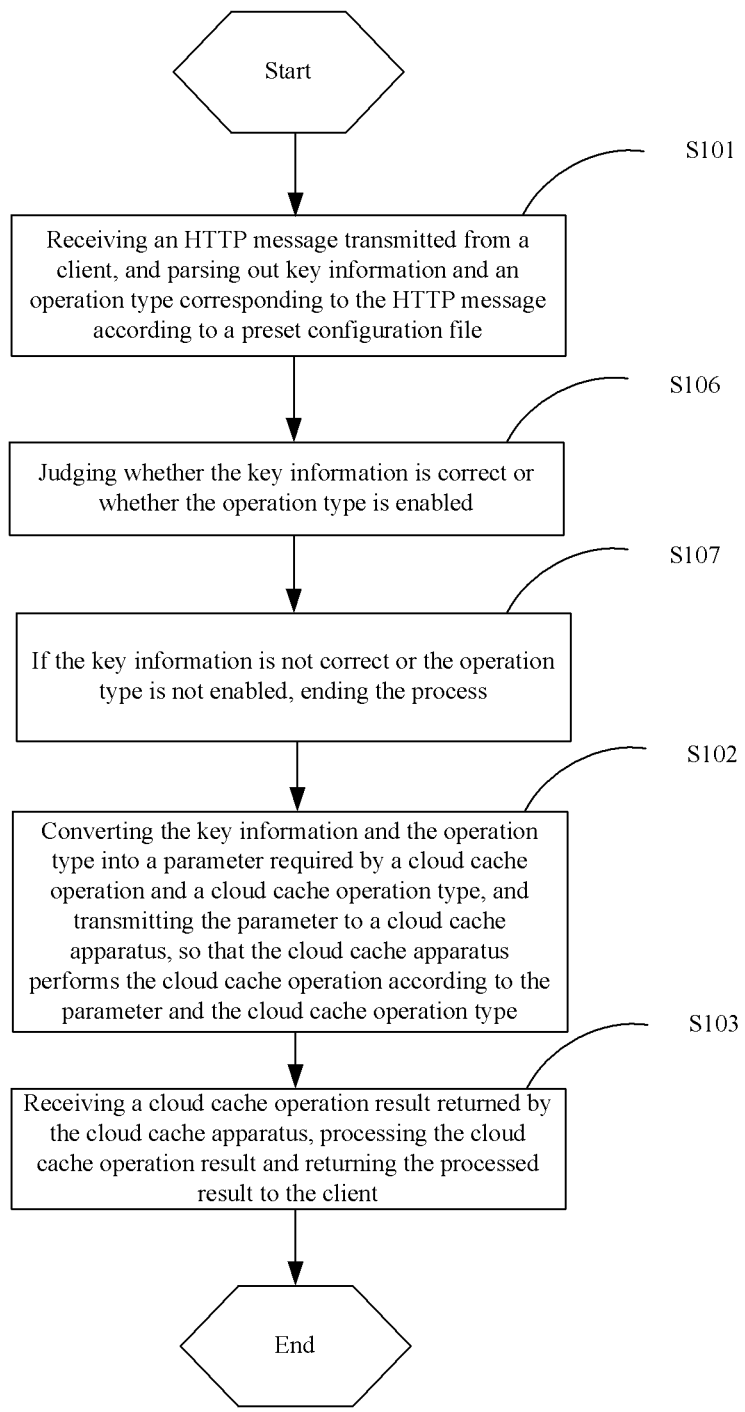
FIG. 5 shows a flowchart of another embodiment of the method for realizing a REST interface of a cloud cache in an Nginx according to the present invention.

Referring to FIG. 5, in another embodiment of the method for realizing a REST interface of a cloud cache in an Nginx according to the present invention, after Step S101 and before Step S102, the method further includes the following steps.

Step S106: it is judged whether the key information is correct or whether the operation type is enabled.

After the key information and the operation type corresponding to the HTTP message received from the client are parsed out according to the preset configuration file, it is first needed to judge whether the key information is correct or whether the operation type of the HTTP message is enabled, so as to judge, according to the determination result, whether to convert the key information and the operation type of the HTTP message into a parameter required by the cloud cache operation and a cloud cache operation type.

Step S107: if the key information is not correct or the operation type is not enabled, the process is ended.

After the key information and the operation type of the HTTP message are judged, if it is judged that the key information is correct or the operation type of the HTTP message is enabled, the key information and the operation are converted into the parameter required by the cloud cache operation and the cloud cache operation type, and the parameter is transmitted to the cloud cache apparatus, so that the cloud cache apparatus can perform corresponding cloud cache operation according to the converted cloud cache operation type; otherwise, if it is judged that the key information is not correct or the operation type of the HTTP message is not enabled, it is not necessary to convert the key information and the operation type of the HTTP message, but to end the process directly.

Before converting the key information and the operation type of the HTTP message into the parameter required by the cloud cache operation and the cloud cache operation type, it is first judged whether the key information of the HTTP message is correct and whether the operation type is enabled, if the key information is correct or the operation type is enabled, the key information and the operation type of the HTTP message are converted into the parameter required by the cloud cache operation and the cloud cache operation type, so as to facilitate the cloud cache operation of the cloud cache apparatus; if the key information of the HTTP message is incorrect or the operation type is not enabled, it is not necessary to convert the key information and the operation type of the HTTP message, but to end the process directly. In this way, the speed of the cloud cache operation is further increased and meanwhile some unnecessary operations are avoided.

Figure 6:
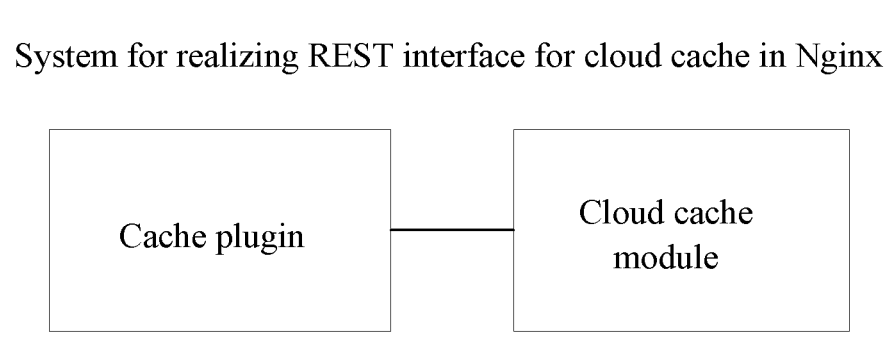
FIG. 6 shows a structure diagram of a system for realizing a REST interface of a cloud cache in an Nginx according to the present invention.
Figure 7:
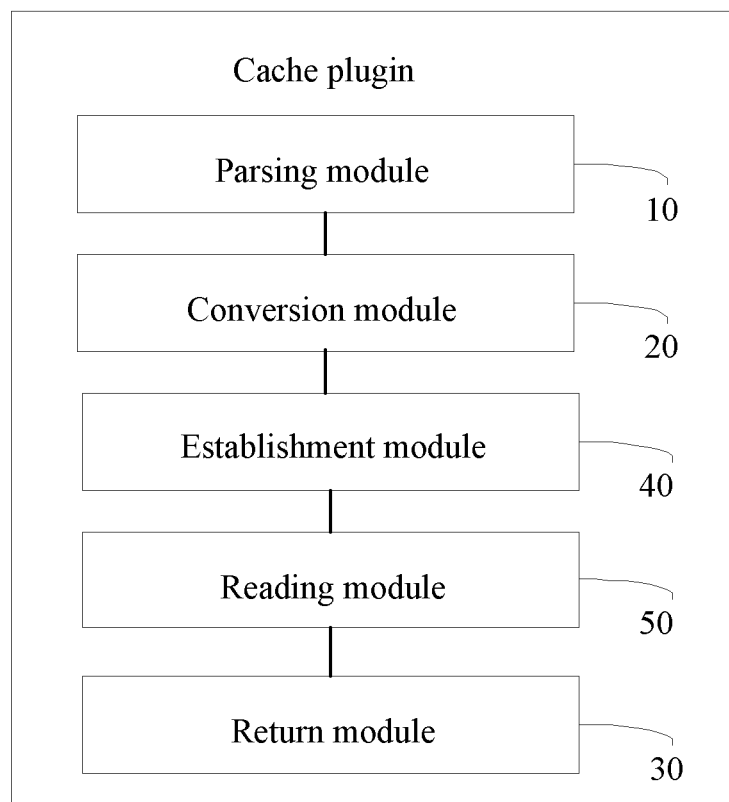
FIG. 7 shows a structure diagram of a cache plugin in one embodiment of the system for realizing a REST interface of a cloud cache in an Nginx according to the present invention.

Referring to FIG. 6 and FIG. 7, which provide one embodiment of a system for realizing a REST interface of a cloud cache in an Nginx according to the present invention, the system includes a cache plugin and a cloud cache apparatus, wherein the cloud cache apparatus is configured to perform a cloud cache operation, and the cache plugin includes:

a parsing module 10, which is configured to receive an HTTP message transmitted from a client, and parse out key information and an operation type corresponding to the HTTP message according to a preset configuration file;

a conversion module 20, which is configured to convert the key information and the operation type into a parameter required by the cloud cache operation and a cloud cache operation type, and transmit the parameter to the cloud cache apparatus, so that the cloud cache apparatus performs the cloud cache operation according to the parameter and the cloud cache operation type; and a return module 30, which is configured to receive a cloud cache operation result returned by the cloud cache apparatus, process the cloud cache operation result, and return the processed result to the client.

In this embodiment, an existing cache for the Nginx is replaced by the cloud cache apparatus, that is to say, the cache mechanism of the Nginx is separated and is submitted to a cloud cache thread for maintenance and management. Meanwhile, a cache plugin is set in the Nginx server to combine the Nginx and the cloud cache apparatus, so as to establish data transfer between the Nginx and the cloud cache apparatus.

After the Nginx is started, the Nginx would acquire automatically a configuration file preset in the system. This configuration file includes the configuration information added in Nginx.conf according to the configuration content required by the system. Meanwhile, the cloud cache apparatus starts to load a dynamic file library thereof so as to start a cloud cache thread. Then, a snooping port of the Nginx waits a request of a HTTP message; after receiving an HTTP message, this message is submitted to the cache plugin for processing. The cache plugin parses out the key information corresponding to the HTTP message and the operation type of the HTTP message according to the configuration information included in the configuration file. The configuration of the Nginx system is very flexible, which not only supports the configuration of expected quantity value but also supports the configuration of variable, so that parameters can be changed with each HTTP request. In this embodiment, variables can be configured in the configuration file; when the HTTP-Header of the HTTP message received by the Nginx system has a variable, the cache plugin would determine the cloud cache operation type corresponding to the HTTP message according to this variable preferably.

In this embodiment, since the buffering function of the Nginx is realized by the cloud cache apparatus which is a distributed cache system based on Key-Value storage mode, after the key information corresponding to the HTTP message is parsed out according to the configuration information in the configuration file, the conversion module 20 needs to convert the key information into a parameter required by the cloud cache operation; meanwhile, since the operation type of the HTTP message is REST interface, including: POST, GET, DELETE and PUT, and the cloud cache operation supports six operation types, including: SET operation, GET operation, DELETE operation, GETDEL operation, INCR operation and STEP operation, it is needed to convert the operation type of the received HTTP message into the cloud cache operation type supported by the cloud cache operation. Then, the converted parameter required by the cloud cache operation is transmitted to the cloud cache apparatus, so that the cloud cache apparatus can perform the cloud cache operation according to the received parameter and the cloud cache operation type.

After the cloud cache apparatus performs the cloud cache operation according to the received parameter and the cloud cache operation type, the cloud cache apparatus would return the operation result to the cache plugin. After receiving the operation result returned by the cloud cache apparatus, the return module 30 also needs to further process the operation result and return the processed result to the client. In this embodiment, processing the operation result refers to recombining the operation result into the content needed by the HTTP request message requested by the client and returning the content to the HTTP client through an existing channel of the Nginx. In this way, the cache function of the Nginx can be realized through cloud cache in the Nginx and the purpose of realizing a REST interface of a cloud cache is achieved.

The system provided by the embodiment of the present invention for realizing a REST interface of a cloud cache in an Nginx combines the Nginx and the cloud cache apparatus by replacing an Nginx cache with the cloud cache apparatus and implementing a cache plugin in the Nginx server, so as to establish data transfer between the Nginx and the cloud cache apparatus, thereby realizing the cache function of the Nginx using the cloud cache apparatus in the Nginx and realizing a REST interface of a cloud cache. The method adopted to realize the cache function of the Nginx using a cloud cache technology rather than a cache of the Nginx can better save CPU resources, and enable a larger cache capacity and a more powerful cache function of the Nginx, owing to the high performance of the Nginx and the high performance, high reliability and good extensibility of cloud cache.

Figure 8:
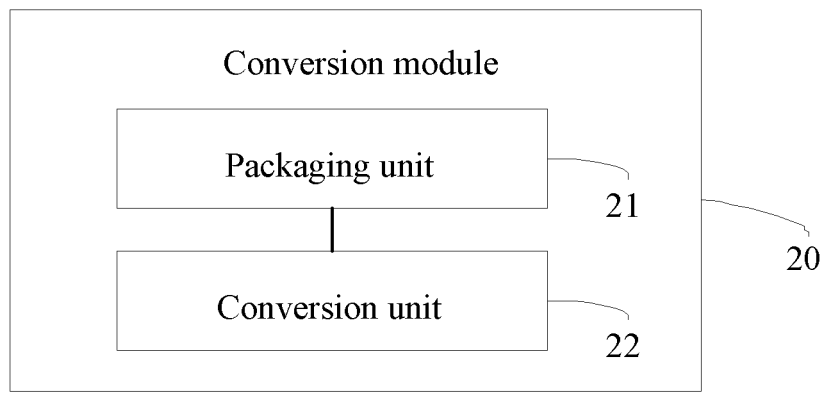
FIG. 8 shows a structure diagram of a conversion module shown in FIG. 7.

Referring to FIG. 8, in one embodiment of the system for realizing a REST interface of a cloud cache in an Nginx according to the present invention, the conversion module 20 includes:

a packaging unit 21, which is configured to package the key information corresponding to the HTTP message as a Key-Value packet required by the cloud cache operation, and transmit the Key-Value packet to the cloud cache apparatus for processing; and a conversion unit 22, which is configured to convert the operation type into a cloud cache operation type, so that the cloud cache apparatus performs operation according to the cloud cache operation type.

In this embodiment, since the cloud cache apparatus is a distributed cache system based on Key-Value storage mode, after the key information corresponding to the HTTP message is parsed out, the key information is converted into a parameter required by the cloud cache operation; thus, it is needed to package the key information of the HTTP message as the Key-Value storage mode based data used for a cloud cache, that is, the packaging unit 21 packages the key information to form a Key-Value packet of the cloud cache, and then transmits the Key-Value packet to the cloud cache apparatus, so that the cloud cache apparatus performs the cloud cache operation according to the data contained in the Key-Value packet after receiving the Key-Value packet.

After the operation type corresponding to the received HTTP message is obtained according to the configuration information included in the preset configuration file, since the cloud cache apparatus does not support the REST interface, the conversion unit 22 needs to convert the operation type of the HTTP into a cloud cache operation type supported by the cloud cache operation, so that the operation can be performed in the cloud cache apparatus according to the cloud cache operation type. In this embodiment, in the operation type conversion, POST operation and PUT operate can be converted into a cloud cache SET operation, GET operation can be converted into a cloud cache GET operation, DELETE operation can be converted into a cloud cache DELETE operation; then, the cloud cache apparatus can perform corresponding cloud cache operation according to the cloud cache operation type. In this way, REST interface can be realized on cloud cache. If a variable is configured in the configuration file of the Nginx:

dcache_incr_base $http_base;

dcache_incr_step $http_step;

and the HTTP-Header of the HTTP message received by the Nginx has the following message header:

base:1000 step:1 then, while parsing the operation type of the HTTP message, it can be determined that the operation type of the HTTP message is INCR operation according to this variable.

The key information corresponding to the HTTP message is packaged as a Key-Value packet of the cloud cache, so that the cloud cache apparatus performs the cloud cache operation according to the data in the Key-Value packet. Meanwhile, the operation type of the HTTP message is converted into a cloud cache operation type supported by the cloud cache operation, so that the cloud cache apparatus performs the corresponding cloud cache operation according to the cloud cache operation type. In this way, the REST interface of the cloud cache apparatus is realized; thus, the cache function of the Nginx can be realized through cloud cache, the large cache capacity is further guaranteed, and the cache function of the Nginx is more powerful.

Referring to FIG. 7, in one embodiment of the system for realizing a REST interface of a cloud cache in an Nginx according to the present invention, the cache plugin further includes:

an establishment module 40, which is configured to establish one named pipe according to the cloud cache operation type;

a reading module 50, which is configured to regularly detect whether there are data returned from the cloud cache apparatus existing in the named pipe, and read out the data in the pipe file if there are data returned from the cloud cache apparatus existing in the named pipe.

Since the Nginx has no available support function to support the communication mechanism between non-related programs at present, a named pipe mode is adopted to establish the data communication between the cloud cache thread and the Nginx in this embodiment. In this way, after the operation type of the HTTP message is converted into a cloud cache operation type, the establishment module 40 can establish one named pipe according to the cloud cache operation type, wherein this named pipe is used to implement the data communication between the cache plugin and the cloud cache apparatus. The Nginx runs multiple threads, thus, one named pipe is established; since this named pipe is unique, the uniqueness of the data communication between the cache plugin and the cloud cache apparatus can be ensured. In this way, the cloud cache apparatus calls an interface function of itself to perform the corresponding cloud cache operation according to the cloud cache operation type converted from the operation type of the HTTP message, and writes the data subjected to the cloud cache operation into the named pipe and returns the data.

While the cloud cache apparatus performs the corresponding cloud cache operation according to the cloud cache operation type converted from the operation type of the HTTP message, a timer used for periodically detecting the named pipe is started, so as to regularly detect whether there are data subjected to the cloud cache operation according to the cloud cache operation type returned from the cloud cache apparatus existing in the named pipe; if it is detected that there are data existing in the named pipe, the reading module 50 reads out the data. In this way, the data communication between the cloud cache thread and the Nginx is completed.

One named pipe is established according to the cloud cache operation type corresponding to the HTTP message, to ensure the uniqueness of the data communication between the cache plugin and the cloud cache apparatus. In this way, after the cloud cache apparatus performs the cloud cache operation, and after it is determined through the timer that there are data returned from the cloud cache apparatus existing in the named pipe, it is only needed to read out the data in the named pipe. This named pipe mode, which is adopted to realize the data communication between the cloud cache apparatus and the Nginx, not only ensures the accuracy and uniqueness of the data, but also accomplishes the cloud cache operation conveniently and quickly, thereby further guaranteeing the powerful performance of the Nginx cache and saving the wait time of a user.

Figure 9:
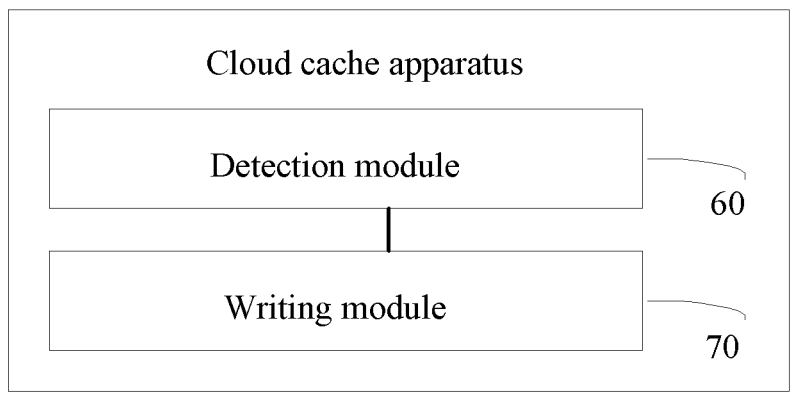
FIG. 9 shows a structure diagram of a cloud cache apparatus in one embodiment of the system for realizing a REST interface of a cloud cache in an Nginx according to the present invention.

Referring to FIG. 9, in one embodiment of the system for realizing a REST interface of a cloud cache in an Nginx according to the present invention, the cache plugin further includes:

a detection module 60, which is configured to detect whether the named pipe exists;

a writing module 70, which is configured to write the data into the named pipe if the named pipe exists.

After the cloud cache apparatus calls an interface function of itself and performs the corresponding cloud cache operation according to the cloud cache operation type corresponding to the received HTTP message, the cloud cache apparatus would write the data obtained after the operation into the named pipe established by the cache plugin for storage, and return this named pipe. Therefore, after the cloud cache operation is completed, the detection module 60 would first detect whether the named pipe established by the cache plugin exists, so as to write the data into the pipe and return the pipe.

If the cloud cache apparatus detects that the named pipe established by the cache plugin exists, the writing module 70 would write the data subjected to the cloud cache operation according to the received cloud cache operation type into this pipe, and then return the named pipe stored with data to the cache plugin.

After the cloud cache apparatus performs the corresponding operation according to the received cloud cache operation type and needs to store and return the data obtained after the operation, the cloud cache apparatus first detects whether the named pipe established by the cache plugin exists; after detecting the named pipe, the cloud cache apparatus can write the data into the pipe and then return the pipe file to the cache plugin, so that the cache plugin can read out the data in the pipe file.

Figure 10:
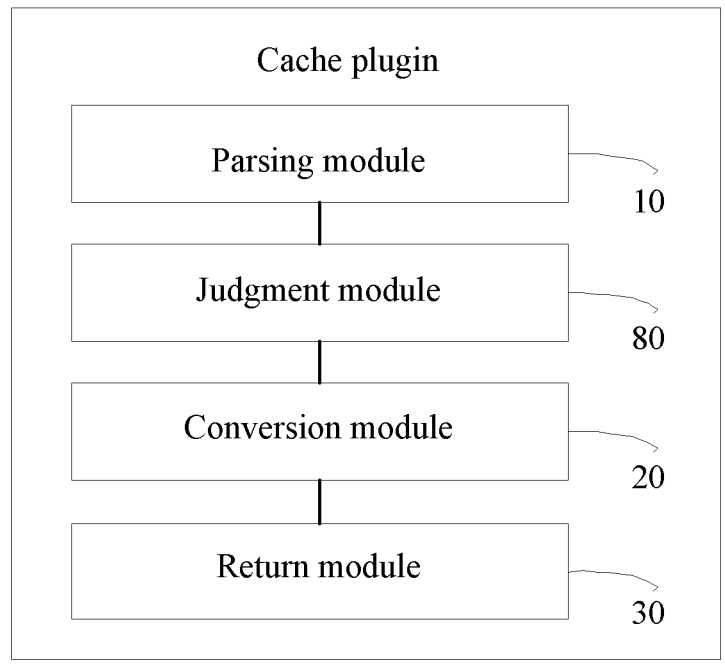
FIG. 10 shows a structure diagram of another embodiment of the system for realizing a REST interface of a cloud cache in an Nginx according to the present invention.

Referring to FIG. 10, in another embodiment of the system for realizing a REST interface of a cloud cache in an Nginx according to the present invention, the cache plugin further includes:

a judgment module 80, which is configured to judge whether the key information is correct or whether the operation type is enabled, and to end the process if the key information is not correct or the operation type is not enabled After the key information and the operation type corresponding to the HTTP message received from the client are parsed out according to the preset configuration file, the judgment module 80 first needs to judge whether the key information is correct or whether the operation type of the HTTP message is enabled, so as to judge, according to the determination result, whether to convert the key information and the operation type of the HTTP message into a parameter required by the cloud cache operation and a cloud cache operation type. After the key information and the operation type of the HTTP message are judged, if it is judged that the key information is correct or the operation type of the HTTP message is enabled, the key information and the operation are converted into the parameter required by the cloud cache operation and the cloud cache operation type, and the parameter is transmitted to the cloud cache apparatus, so that the cloud cache apparatus can perform corresponding cloud cache operation according to the converted cloud cache operation type; otherwise, if it is judged that the key information is not correct or the operation type of the HTTP message is not enabled, it is not necessary to convert the key information and the operation type of the HTTP message, but to end the process directly.

Before converting the key information and the operation type of the HTTP message into the parameter required by the cloud cache operation and the cloud cache operation type, it is first judged whether the key information of the HTTP message is correct and whether the operation type is enabled, if the key information is correct or the operation type is enabled, the key information and the operation type of the HTTP message are converted into the parameter required by the cloud cache operation and the cloud cache operation type, so as to facilitate the cloud cache operation of the cloud cache apparatus; if the key information of the HTTP message is incorrect or the operation type is not enabled, it is not necessary to convert the key information and the operation type of the HTTP message, but to end the process directly. In this way, the speed of the cloud cache operation is further increased and meanwhile some unnecessary operations are avoided.

The above are only the preferred embodiments of the present invention and are not intended to limit the patent scope of the present invention. Any equivalent structures or equivalent flow modifications made according to the description and the accompanying drawings of the present invention, or any equivalent structures or equivalent flow modifications applied in other relevant technical fields directly or indirectly are deemed to be included in the patent protection scope of the present invention.

What is claimed is:

1. A method for realizing a Representational State Transfer (REST) interface of a cloud cache in an Engine x (Nginx), comprising:

receiving, by a cache plugin, a Hyper Text Transport Protocol (HTTP) message transmitted from a client, and parsing, by the cache plugin, out key information and an operation type corresponding to the HTTP message according to a preset configuration file;

converting, by the cache plugin, the key information and the operation type into a parameter required by a cloud cache operation and a cloud cache operation type, and transmitting, by the cache plugin, the parameter to a cloud cache apparatus, so that the cloud cache apparatus performs the cloud cache operation according to the parameter and the cloud cache operation type; and receiving, by the cache plugin, a cloud cache operation result returned by the cloud cache apparatus, processing the cloud cache operation result, and returning, by the cloud cache apparatus, the processed result to the client.

2. The method according to claim 1, wherein converting, by the cache plugin, the key information and the operation type into the parameter required by the cloud cache operation and the cloud cache operation type, and transmitting, by the cache plugin, the parameter to the cloud cache apparatus further comprises:

packaging, by the cache plugin, the key information corresponding to the HTTP message as a Key-Value packet required by the cloud cache operation, and transmitting, by the cache plugin, the Key-Value packet to the cloud cache apparatus for processing; and converting, by the cache plugin, the operation type into the cloud cache operation type, so that the cloud cache apparatus operates according to the cloud cache operation type.

3. The method according to claim 2, further comprising after converting, by the cache plugin, the operation type into the cloud cache operation type:

establishing, by the cache plugin, one named pipe according to the cloud cache operation type; and regularly detecting, by the cache plugin, whether there are data returned from the cloud cache apparatus existing in the named pipe; if there are data returned from the cloud cache apparatus existing in the named pipe, reading out the data in the pipe file.

4. The method according to claim 3, wherein returning, by the cloud cache apparatus, the cloud cache operation result by the cloud cache apparatus further comprises:

detecting, by the cloud cache apparatus, whether the named pipe exists; and if the named pipe exists, writing, by the cloud cache apparatus, data into the named pipe.

5. The method according to claim 1, further comprising before converting, by the cache plugin, the key information and the operation type into the parameter required by the cloud cache operation and the cloud cache operation type:

judging, by the cache plugin, whether the key information is correct or whether the operation type is enabled; and if the key information is not correct or the operation type is not enabled, ending, by the cache plugin, the process.

6. A system for realizing a Representational State Transfer (REST) interface of a cloud cache in an Engine x (Nginx) comprising a cache plugin and a cloud cache apparatus, wherein the cloud cache apparatus is configured to perform a cloud cache operation, and the cache plugin comprises a processor, a memory, and one or more program modules stored in the memory, the one or more program modules comprising:

a parsing module, stored in the memory, which, when executed, causes the processor to receive a Hyper Text Transport Protocol (HTTP) message transmitted from a client, and parse out key information and an operation type corresponding to the HTTP message according to a preset configuration file;

a conversion module, stored in the memory, which, when executed, causes the processor to convert the key information and the operation type into a parameter required by a cloud cache operation and a cloud cache operation type, and transmit the parameter to the cloud cache apparatus, so that the cloud cache apparatus performs the cloud cache operation according to the parameter and the cloud cache operation type; and a return module, stored in the memory, which, when executed, causes the processor to receive a cloud cache operation result returned by the cloud cache apparatus, process the cloud cache operation result, and return the processed result to the client.

7. The system according to claim 6, wherein the conversion module comprises:

a packaging unit, stored in the memory, which, when executed, causes the processor to package the key information corresponding to the HTTP message as a Key-Value packet required by the cloud cache operation, and transmit the Key-Value packet to the cloud cache apparatus for processing; and a conversion unit, stored in the memory, which, when executed, causes the processor to convert the operation type into the cloud cache operation type, so that the cloud cache apparatus operates according to the cloud cache operation type.

8. The system according to claim 7, wherein the one or more program modules further comprise:

an establishment module, stored in the memory, which, when executed, causes the processor to establish one named pipe according to the cloud cache operation type;

a reading module, stored in the memory, which, when executed, causes the processor to regularly detect whether there are data returned from the cloud cache apparatus existing in the named pipe, and read out the data in the pipe file if there are data returned from the cloud cache apparatus existing in the named pipe.

9. The system according to claim 8, wherein the cloud cache apparatus comprises another memory and another processor, and wherein the cloud cache apparatus further comprises:

a detection module, stored in the another memory, which, when executed, causes the another processor to detect whether the named pipe exists;

a writing module, stored in the another memory, which, when executed, causes the another processor to write data into the named pipe if the named pipe exists.

10. The system according to claim 6, wherein the one or more program modules further comprise:
a judgment module, stored in the memory, which, when executed, causes the processor to judge whether the key information is correct or whether the operation type is enabled, and end the process if the key information is not correct or the operation type is not enabled.

\* \* \* \* \*